United States Patent
Houston et al.

(10) Patent No.: US 7,312,628 B2
(45) Date of Patent: Dec. 25, 2007

(54) METHOD AND APPARATUS FOR CAN BUS AUTO-TERMINATION

(75) Inventors: Timothy R. Houston, Weston, FL (US); Charles E. Browder, Boca Roton, FL (US); Carlos A. Garrafa, North Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 121 days.

(21) Appl. No.: 11/288,616

(22) Filed: Nov. 29, 2005

(65) Prior Publication Data
US 2007/0120574 A1    May 31, 2007

(51) Int. Cl.
*H03K 17/16* (2006.01)
(52) U.S. Cl. .......................................... 326/30; 326/27
(58) Field of Classification Search .................. 326/26, 326/27, 30
See application file for complete search history.

(56) References Cited

U.S. PATENT DOCUMENTS

| | | | | |
|---|---|---|---|---|
| 5,434,516 | A * | 7/1995 | Kosco | 326/30 |
| 6,516,366 | B1 * | 2/2003 | Gates et al. | 710/105 |
| 6,587,968 | B1 * | 7/2003 | Leyva | 714/43 |
| 6,970,953 | B2 * | 11/2005 | Gregory et al. | 710/15 |

* cited by examiner

*Primary Examiner*—Don Le
(74) *Attorney, Agent, or Firm*—Barbara R. Doutre

(57) ABSTRACT

A cable area network (CAN) bus termination (100) is provided by an interface 104 operably coupling a cable detection input pin (3), a switch (120) and a termination resistance (130) to detect the presence and absence of one or more cables (108). The termination resistance (130) is automatically enabled to create terminations at end nodes and is automatically disabled to provide a daisy-chain connection between interim nodes of a multi-cable system.

17 Claims, 4 Drawing Sheets

METHOD AND APPARATUS FOR CAN BUS AUTO-TERMINATION

TECHNICAL FIELD

This invention relates in general to communication systems and more particularly to CAN bus auto-termination circuits and methods for use in communication systems.

BACKGROUND

The Controller Area Network (CAN) protocol is a serial communication protocol for communicating between various electronic devices or nodes. In accordance with CAN protocol (ISO 11898), multiple different electronic devices or nodes can be coupled to a single serial bus. Identifier bits are provided in CAN frames to allow messages and data to be directed to certain nodes on the CAN bus, and not to other nodes on the CAN bus. For example, if a device associated with an automobile dashboard sends a frame onto the CAN bus requesting that the headlights be turned on, the device on the CAN bus responsible for the brake lights can determine that the frame is intended for another device and not act upon the frame. The device controlling the headlights, however, receives and acts upon the frame by turning on the headlights.

Since the CAN signals are propagated on a common bus, reflected signals can compromise the integrity of the system. To address signal reflection concerns, resistors are typically incorporated into the CAN bus circuit at the ends of the CAN bus. Resistors are also typically provided to satisfy driver requirements of a resistive load. For example, in the ISO11898, the drivers require 60 ohms of resistive load. This requires finding the last nodes (each end) on a CAN bus and adding a termination resistor only to the ends of the nodes (ISO898 recommends approximately 120 ohm+/−10%). Because CAN bus nodes are connected in parallel, it is not always an easy task to find the last node, especially when an undetermined number of nodes are present.

Both mechanical and electrical approaches have been used to attempt to address CAN termination. Most mechanical approaches tend to use expensive relays and customer depression switches. As an example of a mechanical approach, some Ethernet boxes include a physical switch that engages or disengages when attaching a cable. Although this allows for cable detection, this mechanical approach does not adequately resolve auto-termination, since most of the boxes require a phone-jack plug containing a resistor in order to terminate the node. Another mechanical approach is to put the termination resistors inside a plug which attaches to the end of a cable, thus mechanically terminating only the nodes to which the plug is attached. This mechanical approach, however, can lead to issues if an individual inadvertently disconnects the plug thus defeating the purpose of the termination to the bus and making, for example, an entire remote-mount radio system unreliable. In the automotive industry, such terminations are not typically accessible to the consumer for just that reason.

An existing electrical approach to auto-termination described in U.S. Pat. No. 6,587,968 involves monitoring an electrical operating parameter of CAN data communication activity. However, this two stage circuit approach is rather complicated and is dependent on active signal detection in order to accomplish auto-termination. The power-on signal requirement means that each node is responsible for regenerating a power-on signal for the next node. This approach has a limitation in that a threshold is necessary in order to determine node presence, through techniques such as current monitoring. If the threshold varies, due to events such as temperature or part tolerance variations, or if a node is unable to power-up and draw current, then the method of cable detection can be compromised. As remote mount radios and accessories become more prevalent the need to adopt an auto-termination circuit becomes highly desirable.

Accordingly, there is a need for an improved termination circuit and technique for a CAN bus.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
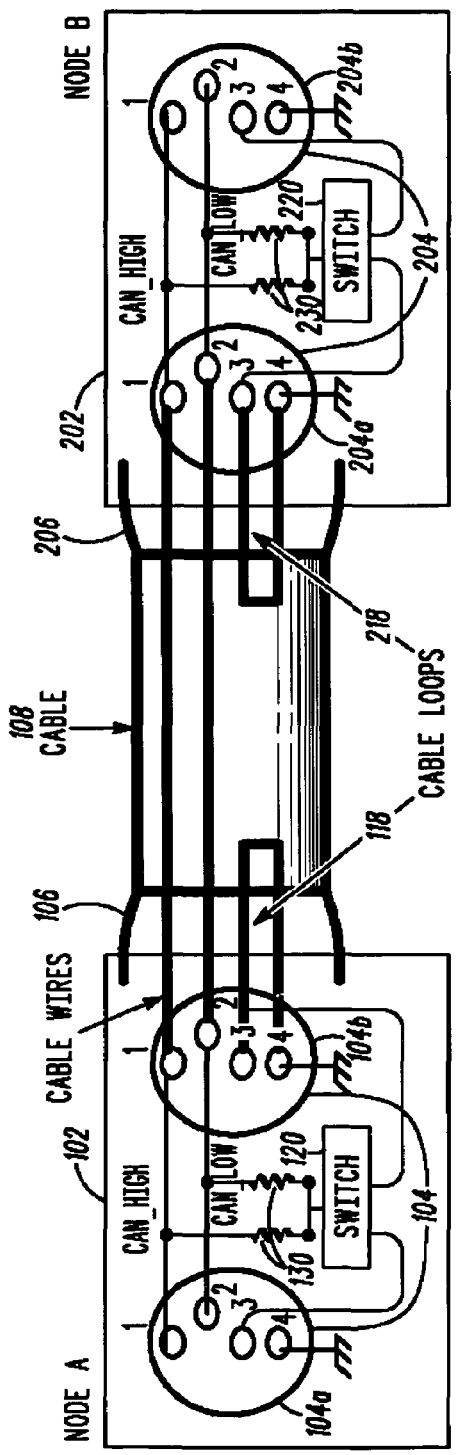
FIG. 1 is a block diagram representing two CAN bus terminations interconnected with a cable in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention may be embodied in several forms and manners. The description provided below and the drawings show exemplary embodiments of the invention. Those of skill in the art will appreciate that the invention may be embodied in other forms and manners not shown below. The invention shall have the full scope of the claims and shall not be limited by the embodiments shown below. It is further understood that the use of relational terms, if any, such as first, second, top and bottom, front and rear and the like are used solely for distinguishing one entity or action from another, without necessarily requiring or implying any such actual relationship or order between such entities or actions.

Briefly in accordance with the present invention, there is provided herein an apparatus that provides a passive CAN auto-termination system. The auto-termination system includes a CAN interface that operably couples a cable detection input pin, a switch and a termination resistance to detect the presence and absence of one or more cables. The termination resistance is automatically enabled to create terminations at end nodes and is automatically disabled to provide a daisy-chain connection between interim nodes of a multi-cable system. The terms termination resistance and resistive termination are used interchangeably throughout the detailed description. The CAN auto-termination technique of the present invention provides automatic termination regardless of a node's current drain or "ON" status thereby providing a robust and reliable auto-termination system.

Figure 2:
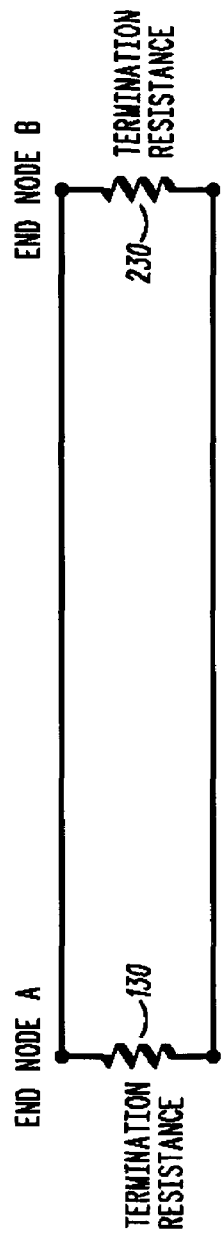
FIG. 2 an illustration of CAN bus termination operation in accordance with the present invention.

FIG. 1 shows two CAN bus terminations 100 and 200 interconnected by a cable and operating in accordance with the present invention. CAN bus terminations 100, 200 represent two nodes within a cable area network system, such as a car radio or radio siren or other CAN devices coupled together in a daisy-chain fashion. FIG. 2 illustrates a theory of operation for FIG. 1 in accordance with the present invention. CAN bus termination 100 includes a substrate 102 having an interface 104 formed of first and second interface portions 104a, 104b disposed thereon for receiving a least one cable connector 106 of cable 108. CAN bus termination 200 includes a substrate 102 having an interface 204 formed of first and second interface portions 204a, 204b disposed thereon for receiving a least one cable connector 206 of cable 108. FIG. 1 shows the single cable 108 interconnecting connector 106 to interface 104b and connector 206 to interface portion 204a. While interface portion 104b is shown interconnected with interface portion 204a, but can interconnect with either interface portion 204a or 204b.

In accordance with the present invention, CAN bus auto-termination circuit 100 includes a cable detection input pin, shown here as pin 3, a switch 120 and a termination resistance 130 operably coupled to detect the presence and absence of one or more cable connectors 106 and to automatically enable and disable the termination resistance 130 to the one or more cables in response thereto. In order to make a passive system, the integration of a simple logic level (high, low) provides for auto-termination at the nodes A, B upon cable contact, throughout the nodes operation. While termination resistance 130 is shown as two resistors, a single resistor could be used instead if desired. As shown in FIG. 2, if only two nodes are coupled together, both nodes A, B are considered END nodes and the default state of auto-termination is to connect/enable the termination resistances 130, 230 between the CAN_HIGH and CAN_LOW differential pair at each END.

Each CAN termination circuit includes two identical interface portions—portions 104a, 104b for node 100 and portions 204a, 204b for node 200. Thus, cable 108 can be connected to either interface of a given node. Pin 4 of all of the interfaces 104a, 104b and 204a, 204b is coupled to ground potential. Cable 108 includes a loop 118, 218 at each connector end 106, 206 that causes the cable detect pin 3 to be grounded once the cable 108 is attached to an interface of the circuit board. Interface traces on the substrate 102 couple pin 1 of interface portion 104a in series with pin 1 of interface portion 104b. Interface traces on the substrate 102 couple pin 2 of interface portion 104b in series with pin 2 of interface portion 104b. Interface portions 204a, 204b are similarly constructed using a switch 220 and termination resistance 230. Termination resistance 230 is shown with two resistors but as mentioned previously a single resistor could also be used if desired. The termination resistance 130 is coupled between pins 1 and 2 when a cable is detected at only one interface portion 104a or 104b (or if no cable is detected at all as a default). Termination resistance 130 is disabled when two cables are attached to the interface portions 104a, 104b as shown in FIG. 3.

Figure 3:
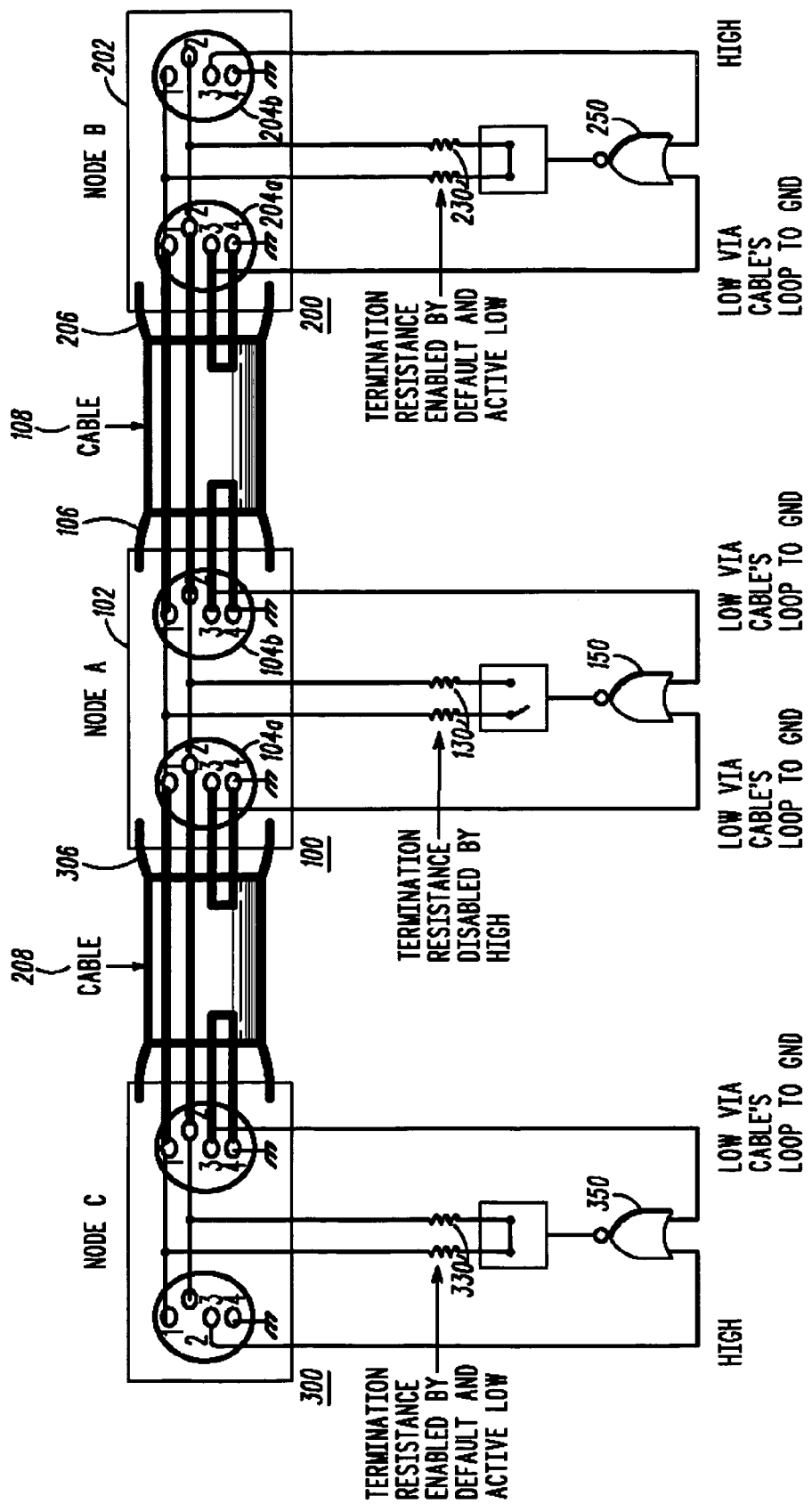
FIG. 3 is an illustration of CAN bus termination for two cables daisy chaining three nodes in accordance with the present invention.

In accordance with the present invention, the CAN bus termination circuit 100 includes switch 120, such as a logic gate, transistor, multiplexer, electrical or optical relay, or other electronic switching device, the switch selectively controlling termination resistance 130 so as to couple the first and second interfaces 104a, 104b when one cable connector 106 is attached to one of the first and second interfaces as shown in FIG. 1, and the termination resistance 130 being disabled, as shown in FIG. 3, by the switch 120 (here shown as logic gate 150) when two cable connectors 106, 306 are coupled to the first and second interfaces 104a, 104b.

In the multi-cable system of FIG. 3, only nodes C and B will have termination resistances 230, 330 activated, since the middle node, node A, has a logic level LOW on both inputs to the NOR gate 150. Thus, the termination resistance 130 is disabled on node A and termination resistance 230 is enabled at node B (via gate 250), and termination resistance 330 is enabled at node C (via gate 350). End nodes B and C can thus be terminated without having to sense any activity from the interim node A.

Figure 4:
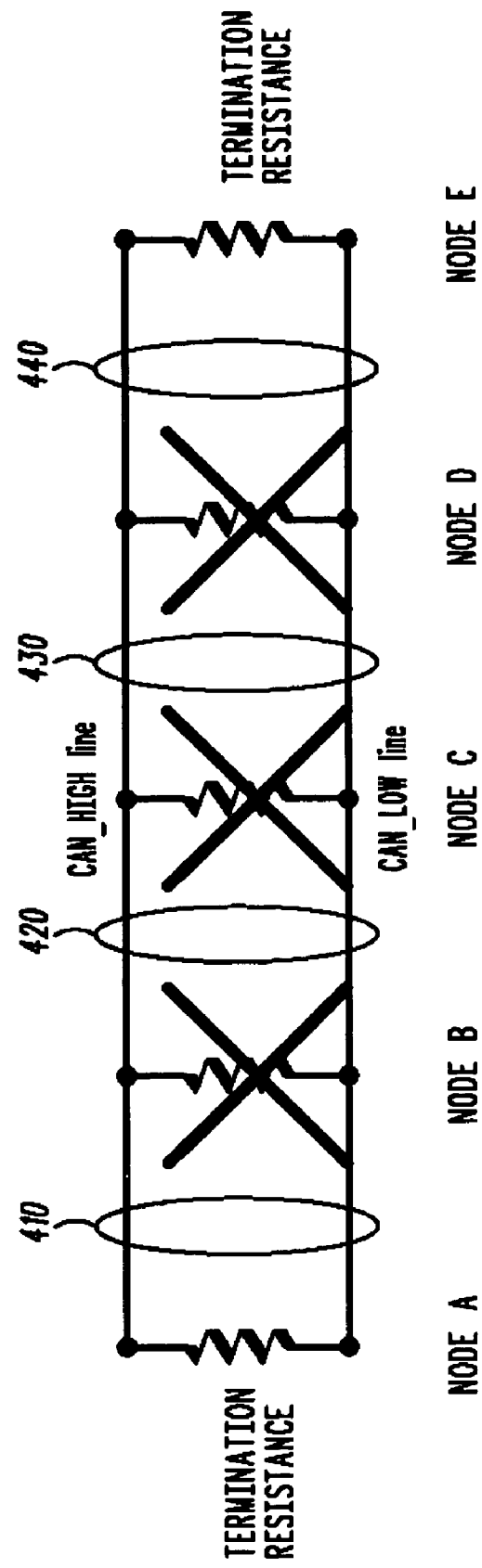
FIG. 4 illustrates a theory of operation for a communication system operating in accordance with a multi-cable embodiment interconnecting more than two nodes utilizing the CAN bus termination of the present invention.

FIG. 4 shows a theory of operation for a communication system 400 operating in accordance with a multi-cable embodiment interconnecting more than two nodes across the same differential pair, CAN_HIGH and CAN_LOW. System 400 includes a plurality of CAN components or nodes, A, B, C, D and E daisy-chained with cables 410, 420, 430, 440 such that two end nodes A and E are separated by a plurality of interim nodes, B, C, D. The plurality of cables are provided with terminations by the electrical switching circuit, discussed above, that automatically provides termination resistances to the two end nodes A, E while disabling termination resistances to the interim nodes B, C and D. Thus, the auto-termination of the present invention provides the advantage of allowing for infinite combinations of multiple nodes. The CAN auto-termination of the present invention is readily applicable to multiple node architectures allowing for plurality of high-speed data components to operate over a high-frequency transmission line requiring impedance matching termination for the multiple nodes.

Figure 5:
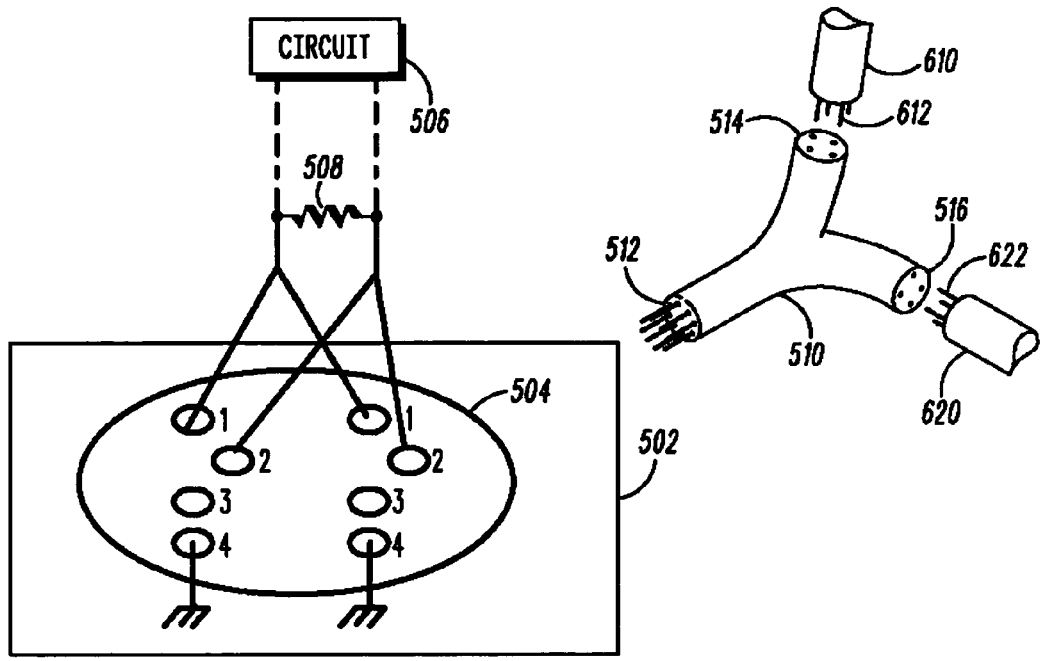
FIGS. 5 and 6 compare two interface configurations for the CAN bus termination of the present invention, one for accepting a Y-split cable and the other for a straight cable.
Figure 6:
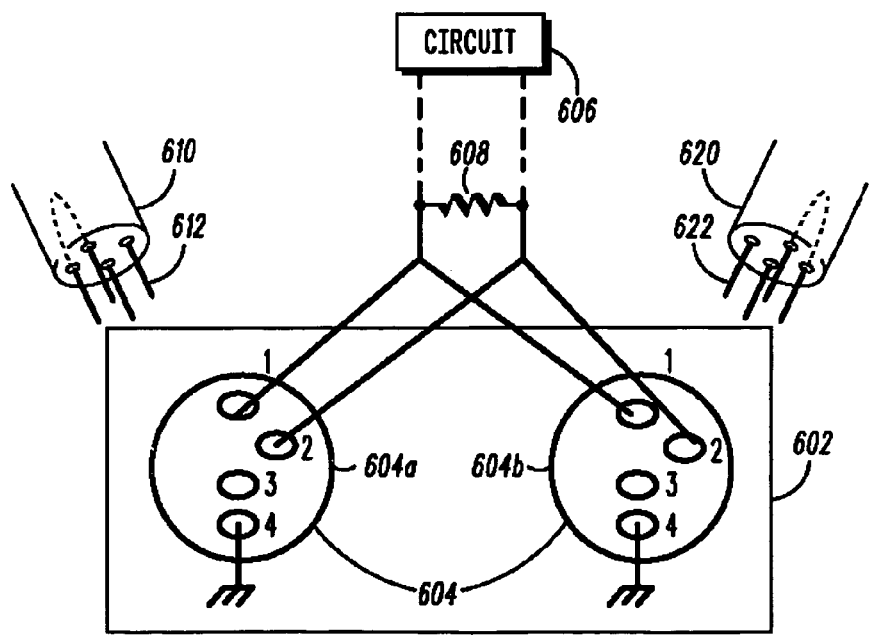

Referring to FIGS. 5 and 6, each figure shows a CAN bus termination 500, 600 formed in accordance with the present invention. FIG. 6 embodies the CAN bus termination discussed previously and is provided to facilitate the discussion of FIG. 5 which represents an alternative physical form factor embodying the same inventive concepts. Cables 610 and 612 are formed in accordance with FIG. 1 having two contacts forming a loop (shown in dashed lines) within each connector end 614, 616. To briefly review, CAN bus termination 600 includes an interface 604 formed of two interface portions 604a, 604b that accept the connectors of two straight cables 610, 612. CAN bus termination 600 includes a substrate 602, circuit 606 coupled to the interface 604, the circuit 606 automatically providing a resistive termination 608 by default in the absence of a cable connector being coupled to the interface 604, and the circuit 606 automatically providing a resistive termination 608 in response to a single cable connector being coupled to an interface portion, and the electrical circuit 606 automatically providing a series connection between two connectors being coupled to the interface 604.

In accordance with the embodiment of FIG. 5, CAN bus termination 500 is formed of a single interface 504 (as opposed to a dual interface) that accepts a Y-split cable having single connector end 510 and Y-split ends 512, 514. A circuit 506, such as previously discussed, is disposed on a substrate 502 and is coupled to the interface 504 to automatically control enabling and disabling of a termination resistor 508. In accordance with the present invention, resistive termination 508 is enabled by default in the absence of a cable connector being coupled to the interface 504. In accordance with this embodiment, resistive termination 508 is also automatically enabled in response to cable connector 510 being coupled to interface 504 along with external cable connector ends 614 or 616 being coupled to either connector end 512 or 514 of the Y-split cable. Resistive termination is disabled in response to both connector ends 512, 514 of the Y-split cable being coupled to both connector ends 614, 616 of separate external cables 610, 612 at the same time.

The interface embodiment shown in FIG. 5, while operating under the same principles previously discussed, utilizes the Y-split cable as an extension to cables 610, 612. The purpose of such an arrangement is to save real estate space in applications having tight space constraints. Basically, the Y-split cable is operating like an extension cord allowing for one interface 504 to mate with the connectors of two cables located further away. Thus, a plurality of interface pins or contacts can be laid out on a substrate to daisy-chain multiple CAN devices utilizing minimal space.

The auto-termination approach of the present invention provides an inexpensive solution as compared to mechanical relays and depression switches. The end node(s) require no information from any internal nodes nor do the end nodes require any activity of the internal nodes (i.e. no sensing). As cable area networks are expanded to applications such as remote mount radios, the auto-termination circuit makes it easier to use third party accessories. The use of a physical plug is eliminated thus avoiding the potential hazards associated when user's removing plugs and defeating the integrity of the CAN communication's system. The auto-termination technique operating in accordance with the present invention allows for high-speed data communication requiring terminations to be daisy chained within a communication system.

Accordingly, there has been provided a cable area network (CAN) bus termination formed of an interface that utilizes a cable detection input pin, a switch and a termination resistance to detect the presence and absence of one or more cables. The automatic enabling/disabling of the termination resistance in response to cables being connected and disconnected allows for end nodes to be terminated and interim nodes to be daisy-chained allows for infinite combinations of multiple nodes. The auto-termination approach of the present invention provides a simple electrical solution to the normally mechanical approach of terminating differential data lines. A consumer system that depends on termination at the end nodes can now be serviced or re-installed without the worry of termination plugs being placed at the correct nodes.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A CAN bus termination circuit, comprising:
a cable detection input pin, a switch and a termination resistance operably coupled to detect the presence and absence of one or more cables and to automatically anable and disable the termination resistance to the one or more cables in response thereto.

2. The CAN bus termination circuit of claim 1, wherein the cable detection input pin provides a logic level to the switch to provide auto-termination upon cable contact to the node.

3. The CAN bus termination of claim 1, wherein the switch comprises a transistor circuit.

4. The CAN bus termination of claim 1, wherein the switch comprises a multiplexer.

5. The CAN bus termination of claim 1, wherein the switch comprises a logic gate.

6. The CAN bus termination of claim 1, wherein the switch comprises an electrical relay.

7. The CAN bus termination of claim 1, wherein the switch comprises an optical relay.

8. A cable area network (CAN) bus termination, comprising:
an interface for receiving at least one cable connector;
a circuit coupled to the interface; and
the circuit automatically providing a resistive termination by default in the absence of a cable connect or being coupled to the interface, and the circuit automatically providing a resistive termination in response to a single cable connector being coupled to the interface, and the circuit automatically providing a series connection between two connectors being coupled to the interface, wherein the interface comprises a single interface for receiving a Y-split cable.

9. The CAN bus termination of claim 8, wherein the circuit comprises an electrical circuit.

10. The CAN bus termination of claim 8, wherein the series connection is provided by disabling the resistive termination.

11. A cable area network (CAN) bus termination, comprising:
an interface for receiving at least one cable connector;
a circuit coupled to the interface; and
the circuit automatically providing a resistive termination by default in the absence of a cable connect or being coupled to the interface, and the circuit automatically providing a resistive termination in response to a single cable connector being coupled to the interface, and the circuit automatically providing a series connection between two connectors being coupled to the interface, wherein the interface comprises first and second interface portions for receiving connectors of two straight cables.

12. A cable area network (CAN) bus termination circuit, comprising:
first and second interfaces for receiving a least one cable connector;
a switch coupled to the first and second interfaces; and
a termination resistance being selectively controlled by the switch so as to couple to the first and second interfaces when one cable connector is attached to one of the first and second interfaces, and the termination resistance being disabled by the switch when two cable connectors are coupled to the first and second interfaces.

13. A communication system, comprising:
a plurality of cable area network (CAN) components;
a plurality of cables daisy-chaining the plurality of CAN components such that two end nodes are separated by a plurality of interim nodes, the plurality of cables being provided with terminations by an electrical switching circuit that automatically enables termination resistances to the two end nodes while disabling termination resistances to the interim nodes, wherein the electrical switching circuit includes a cable detection pin.

14. The communication system of claim 13, wherein the plurality of CAN components are high-speed data components.

15. The communication system of claim 14, wherein the high-speed data components operate over a high-frequency transmission line requiring impedance matching termination for multiple node architectures.

16. A communication system, comprising:
a plurality of cable area network (CAN) components;
a plurality of cables daisy-chaining the plurality of CAN components such that two end nodes are separated by a plurality of interim nodes, the plurality of cables being provided with terminations by an electrical switching circuit that automatically enables termination resistances to the two end nodes while disabling termination resistances to the interim nodes, wherein the two end nodes require no information from any of the interim nodes.

17. A communication system, comprising:
a plurality of cable area network (CAN) components:
a plurality of cables daisy-chaining the plurality of CAN components such that two end nodes are separated by a plurality of interim nodes, the plurality of cables being provided with terminations by an electrical switching circuit that automatically enables termination resistances to the two end nodes while disabling termination resistances to the interim nodes, wherein the two end nodes are provided with termination resistances without sensing any activity of the interim nodes.

* * * * *